(12) United States Patent
Berkovitch (10) Patent No.: US 7,281,437 B2
(45) Date of Patent: Oct. 16, 2007

(54) MULTI-JET WATER METER WITH FLOW COMPENSATING BASKET

(75) Inventor: Eli Berkovitch, Haifa (IL)

(73) Assignee: Arad Dalia, Yokneam (IL)

( * ) Notice: Subject to any disclaimer, the term of this patent is extended or adjusted under 35 U.S.C. 154(b) by 52 days.

(21) Appl. No.: 11/146,906

(22) Filed: Jun. 7, 2005

(65) Prior Publication Data
US 2006/0090572 A1 May 4, 2006

Related U.S. Application Data

(60) Provisional application No. 60/629,471, filed on Nov. 19, 2004, provisional application No. 60/578,602, filed on Jun. 10, 2004.

(51) Int. Cl.
*G01F 1/05* (2006.01)

(52) U.S. Cl. .................................................. 73/861.79

(58) Field of Classification Search ............. 73/861.79, 73/98.87, 257, 197, 198, 861.74; 210/96.1
See application file for complete search history.

(56) References Cited

U.S. PATENT DOCUMENTS

| | | | |
|---|---|---|---|
| 3,709,037 A | 1/1973 | Abbotts | |
| 4,342,224 A * | 8/1982 | Hara et al. | 73/290 R |
| 5,085,076 A * | 2/1992 | Engelmann | 73/197 |
| 5,567,876 A * | 10/1996 | Holmes-Higgin et al. | 73/257 |
| 6,345,541 B1 * | 2/2002 | Hendey | 73/861.79 |
| 6,386,029 B1 | 5/2002 | Katzman et al. | |
| 6,931,946 B1 * | 8/2005 | Hendey | 73/861.79 |

FOREIGN PATENT DOCUMENTS

| | | |
|---|---|---|
| CH | 689 953 A5 | 2/2000 |
| DE | 88 05 780 U1 | 6/1988 |
| EP | 0 573 802 A2 | 12/1993 |
| FR | 968089 | 11/1950 |
| GB | 577756 | 5/1946 |

\* cited by examiner

*Primary Examiner*—Jewel Thompson
(74) *Attorney, Agent, or Firm*—The Webb Law Firm (57) ABSTRACT

A flow measuring system, e.g., a water meter, includes a non-limiting flow compensating basket and/or a vane wheel of the invention. The basket has a hollow cylindrical member having an open end and an opposite end, sidewall of the cylindrical member having a plurality of spaced banks with solid sidewall portions between adjacent banks. Each of the banks has a plurality of holes arranged in rows and columns, wherein the distance between the banks, the number of rows in the banks, the number of columns in the banks, and/or the size of the holes in the banks is varied to control the fluid flow through the banks. The vane water wheel has a center of buoyancy higher than its center of gravity.

18 Claims, 5 Drawing Sheets

MULTI-JET WATER METER WITH FLOW COMPENSATING BASKET

CROSS REFERENCE TO RELATED APPLICATION

The non-limiting embodiments of the present invention relate to the subject matter of U.S. Provisional Patent Application Ser. No. 60/629,471, filed Nov. 19, 2004; and U.S. Provisional Patent Application Ser. No. 60/578,602, filed Jun. 10, 2004, each in the name of Eli Berkovitch for "Multi-jet Meter With Flow Compensation Basket", the applications are hereby incorporated by reference in their entirety.

BACKGROUND OF THE INVENTION

1. Field of the Invention

The present invention relates to a flow-compensating basket and vane wheel for use with a meter having a meter register to measure the flow volume of material, e.g., water moving through a multi-jet water meter, and, more particularly, to a compensating basket having selectively sized and positioned openings or holes in the walls of the basket to balance the force of water flowing through the walls of the compensating basket into a flow distribution chamber to rotate the vane wheel therein, the wheel having its center of gravity spaced from its center of buoyancy to reduce wheel wear.

2. Description of the Presently Available Technology

Meters for measuring flow volume of fluids, e.g., gas, water, such as multi-jet water meters, include a meter body having a cavity or opening interconnecting an inlet chamber and an outlet chamber. A flow measuring arrangement or system to measure and, optionally, record the flow volume of the fluids, e.g., water moving through the meter body, is mounted in the opening connecting the inlet chamber to the outlet chamber. The flow measuring arrangement includes, among other components, a vane water wheel and a meter register. Usually, the vane wheel and the meter register each includes a magnet which interacts with one another to power the flow measuring device of the meter register, e.g., an optical encoder of the type disclosed in U.S. patent application Ser. No. 10/864,312 or U.S. patent application Ser. No. 10/864,308, or reed switches of the type disclosed in PCT Publication No. WO 02/073735, to measure the flow volume of water moving through the meter. The disclosures of the above-mentioned PCT publication and patent applications are hereby incorporated by reference. Essentially, in operation, water flows into and through the inlet chamber of the water meter, passes through holes in the sidewall of a screen or filter and into a flow distribution chamber. The vane water wheel is rotatably mounted in the flow distribution chamber, and the water flowing into and through the flow distribution chamber rotates the water wheel to power the flow measuring device of the meter register to record water volume passing through the flow distribution chamber. The water moves from the flow distribution chamber into the outlet chamber and, thereafter, out of the water meter.

A limitation with the presently available flow measuring arrangements, e.g., of the type taught in U.S. Pat. No. 6,386,029, is that the water flowing through the screen contacts the vanes of the vane water wheel at various velocities about the circumference of the water wheel. The result is applying unbalanced transverse loads on the vane water wheel which can result in premature side wear of the turbine shaft on which the water wheel rotates. Eventually, the side of the turbine shaft has uneven wear resulting in random variations in the rotation of the water wheel resulting in inaccurate readings.

As can be appreciated by those skilled in the art, it would be advantageous to provide a screen or filter and/or vane water wheel that does not have the limitations of the presently available screens and/or vane water wheels.

SUMMARY OF THE INVENTION

This invention relates to a flow compensating basket for a fluid measuring system of the type having a meter register mounted on a flow distribution chamber, a portion of the flow distribution chamber mounted in the flow compensating basket, and a wheel having vanes, e.g., a vane wheel rotatably mounted in the flow distribution chamber.

In one non-limiting embodiment of the invention, the flow compensating basket includes, among other things, a hollow cylindrical member having an open end and an opposite end, with the sidewall of the cylindrical member having a plurality of spaced banks with solid sidewall portions between adjacent banks. Each of the banks has a plurality of holes extending through the sidewall, with the holes of each bank arranged in rows and columns. At least one of the following of (1) distance between the banks, (2) the number of rows in the banks, (3) the number of columns in the banks, and (4) the size of the holes in the banks is varied around the sidewall to control the fluid flow through the banks. In another non-limiting embodiment of the basket, the bottom surface has holes therethrough.

The invention further relates to a vane wheel for a fluid measuring system of the type having a meter register mounted on a flow distribution chamber, a portion of the flow distribution chamber mounted in the flow compensating basket, and the vane wheel rotatably mounted in the flow distribution chamber.

In another non-limiting embodiment of the invention, the vane wheel includes, among other things, a cylindrical body having a first end and an opposite second end, a first elongated passageway accessible from the first end of the body and terminating short of the second end of the body, a second elongated member having one end mounted to and extending away from the second end of the body, and a plurality of spaced vanes extending from the body, wherein distance between the center of buoyancy of the vane wheel and the second end of the body is a first predetermined distance, and distance between the center of gravity of the vane wheel and the second end of the body is defined as a second predetermined distance, and the first predetermined distance is less than the second predetermined distance.

The invention still further relates to a meter for measuring fluid flow, the meter includes, among other things, a flow compensating basket received in a chamber interconnecting the inlet and outlet ends of the meter, a flow distributing chamber mounted in the flow compensating basket, a vane wheel mounted in the flow distributing chamber, and a meter register assembly operatively connected to and acted on by the vane wheel. In a still further non-limiting embodiment of the invention, the flow compensating basket and vane wheel are of the type discussed above.

In another non-limiting embodiment of the invention, the vane wheel and/or the meter measures the flow volume of water.

DETAILED DESCRIPTION OF THE INVENTION

In the following discussion of the non-limiting embodiments of the invention, spatial or directional terms, such as "inner", "outer", "left", "right", "up", "down", "horizontal", "vertical", and the like, relate to the invention as it is shown in the drawing figures. However, it is to be understood that the invention can assume various alternative orientations and, accordingly, such terms are not to be considered as limiting. Further, all numbers expressing dimensions, physical characteristics, and so forth, used in the specification and claims are to be understood as being modified in all instances by the term "about". Accordingly, unless indicated to the contrary, the numerical values set forth in the following specification and claims can vary depending upon the desired properties sought to be obtained by the practice of the invention. At the very least, and not as an attempt to limit the application of the doctrine of equivalents to the scope of the claims, each numerical parameter should at least be construed in light of the number of reported significant digits and by applying ordinary rounding techniques. Moreover, all ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, and all subranges in between, e.g., 1 to 6.3, or 5.5 to 10, or 2.7 to 6.1. Also, as used herein, terms such as "positioned on" or "supported on" mean positioned or supported on but not necessarily in direct contact with the surface.

Further, in the following discussion of the non-limiting embodiments of the invention, it is understood that the invention is not limited in its application to the details of the particular non-limiting embodiments shown and discussed since the invention is capable of other embodiments. Further, the terminology used herein is for the purpose of description and not of limitation and, unless indicated otherwise, like reference numbers refer to like elements.

The non-limiting embodiments of the invention are discussed for use on a water meter; however, as will be appreciated, the invention is not limited thereto, and the non-limiting embodiments of the invention can be used with a meter to measure any type of flowable material, e.g. but not limiting the invention thereto, fluids such as water and gas, and granular materials. Although not limiting to the invention, the water meter in the following discussion is similar to the types disclosed in WO 02/073735 and in U.S. patent application Ser. Nos. 10/864,308 and 10/864,312, which documents are hereby incorporated by reference.

Figure 1:
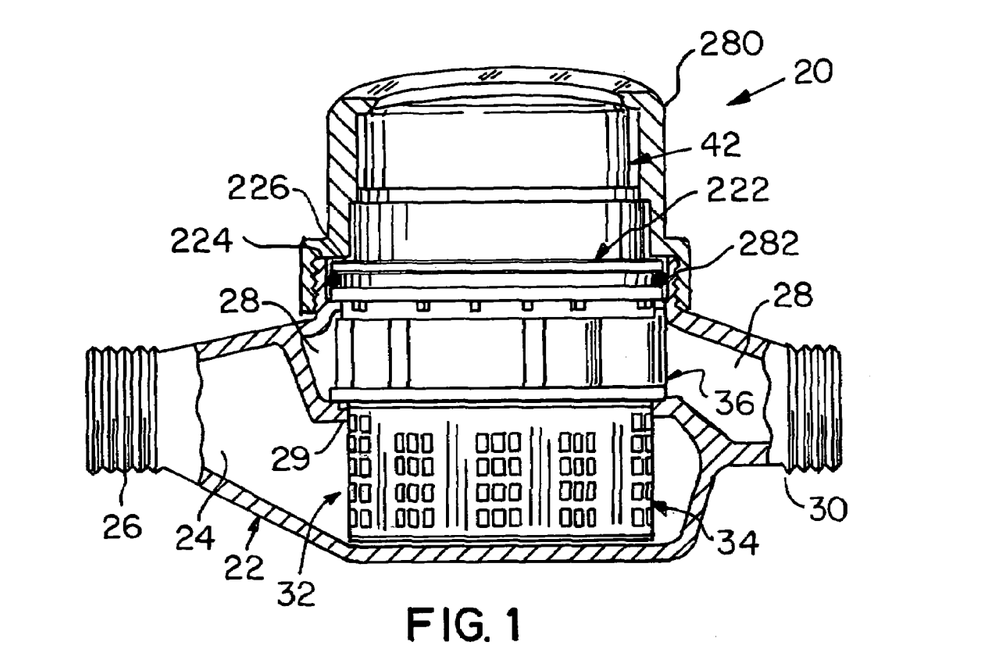
FIG. 1 is a side elevated view, partly in cross section, of a water meter having a flow measuring system or arrangement incorporating features of the invention.

Shown in FIG. 1 is a water meter 20 having a body 22, an inlet or lower chamber 24 in fluid communication with inlet end 26 and with an outlet or upper chamber 28 by way of internal opening 29, and the outlet or upper chamber 28 in fluid communication with outlet end 30. A flow measuring system or arrangement 32 (see also FIG. 2) incorporating features of the invention is mounted in the opening 29 between the inlet and outlet chambers 24 and 28. In general, fluid material, in this discussion of the non-limiting embodiment of the invention, water, moves through the inlet end 26 into the lower chamber 24, moves through flow compensating basket 34 incorporating features of the invention (see FIGS. 2-4) into flow distributing chamber 36 (see FIGS. 2 and 5-7). The water flows or moves into the flow distributing chamber 36 in a circular upward motion around a vane wheel or vane water wheel 38 (see FIGS. 2 and 8-10) incorporating features of the invention and upward through and out of the flow distributing chamber 36. The movement of the water around the vane wheel 38 and through the flow distributing chamber 36 rotates the vane wheel 38 having a magnetic driver (ring magnet 186, see FIG. 10). The rotation of the vane wheel 38 powers a magnetic drive arrangement 40 of meter register 42 (see FIG. 18) of meter register assembly 43 (see FIG. 2 and components in FIGS. 11-18) in a manner discussed below. The water moves out of the flow distributing chamber 36, into the outlet chamber 28, and out of the outlet end 30 of the water meter 20.

Figure 2:
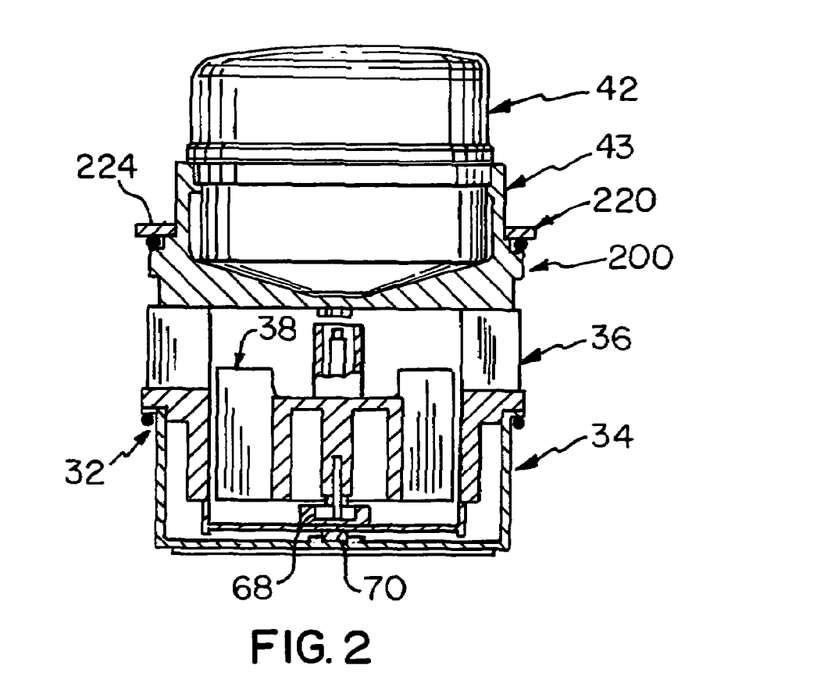
FIG. 2 is a side elevated view, partly in cross section, of the flow measuring system or arrangement shown in FIG. 1.
Figures 3, 4, 5, 6:
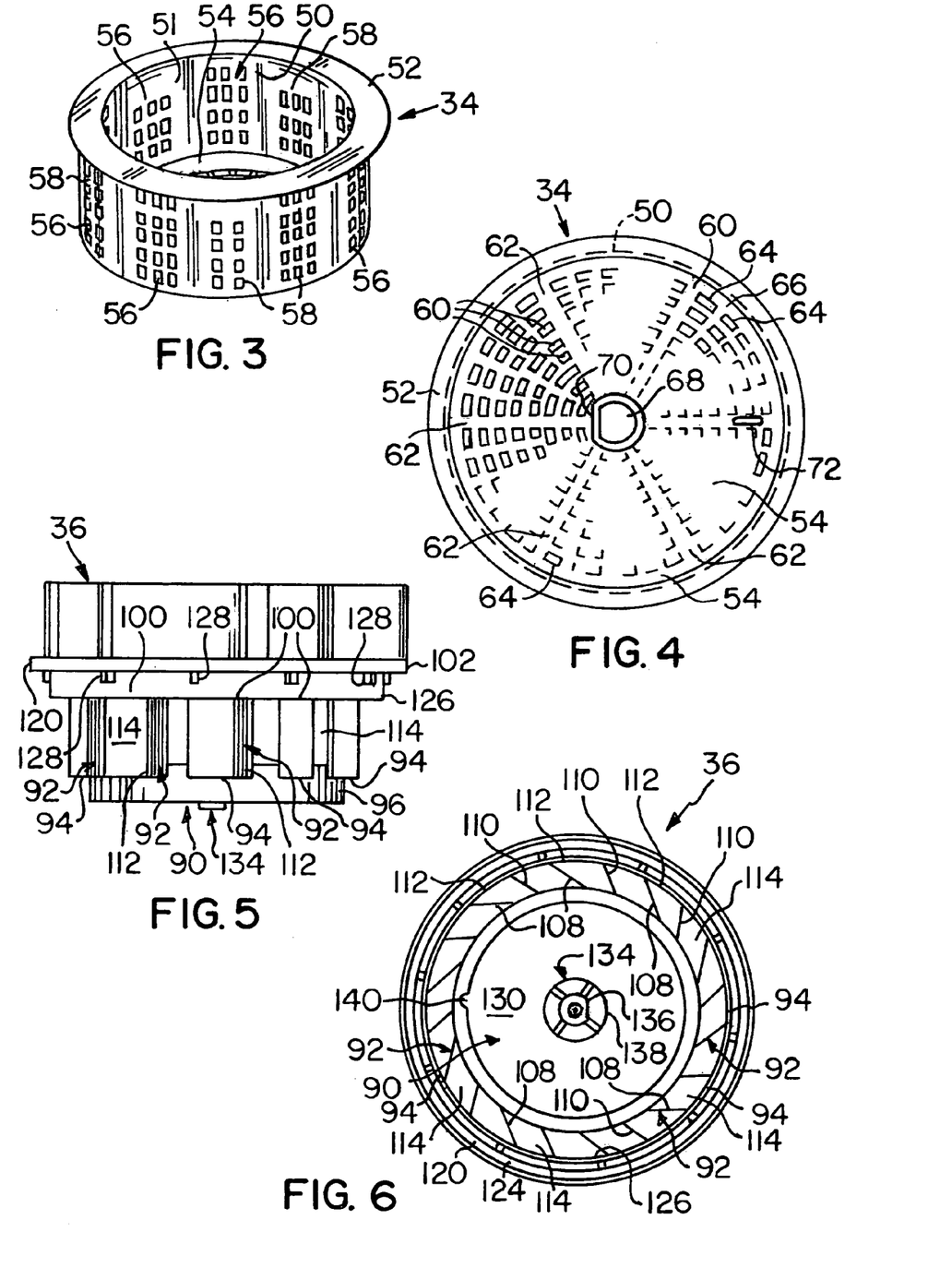
FIG. 3 is an orthogonal view of a non-limiting embodiment of a flow compensating basket of the invention.
FIG. 4 is a top elevated view of the flow compensating basket shown in FIG. 3.
FIG. 5 is a side elevated view of a non-limiting embodiment of a flow distribution chamber incorporating features of the invention.
FIG. 6 is an elevated bottom view of the flow distribution chamber shown in FIG. 5.

With reference to FIGS. 3 and 4, the flow-compensating basket 34 has cylindrically-shaped sidewalls 50 having an open end 51 having an upper ledge 52 for supporting the flow distributing chamber 36 (see FIGS. 2 and 5) in a manner discussed below and a base 54 (see FIG. 4), which is substantially planar and circular in shape. The sidewall 50 has a plurality of banks 56, with each bank 56 having a predetermined number of openings or holes 58 through which water flows to move into the flow distributing chamber 36 to rotate the vane water wheel 38 in a predetermined direction. For example but not limiting to the invention, for flow measuring systems arranged to have the vane wheel rotated in a counterclockwise direction, the number of openings 58 in a bank 56 and the spacing between adjacent banks generally increases, decreases, and increases moving in a counterclockwise direction as viewed in FIG. 3. Each of the holes 58 defines a flow area and the sum of the flow areas for each bank 56 defines a bank flow area, wherein at least one of the bank flow areas is different than the remainder of the bank flow areas of the flow compensating basket 34. For reference but not limiting to the invention, the counterclockwise direction starts at the 6 o'clock position as viewed in FIG. 3, with the first bank 56 of holes 58 at the 6 o'clock position facing the inlet end 26 of the water meter 20 (see FIG. 1). In a non-limiting embodiment of the invention, for a flow compensation basket having an outside diameter of about 2 inches (5.08 centimeters ("cm")) and a sidewall height of about 1½ inches (3.81 cm), ten banks 56 of spaced rectangular holes 58 were provided. The distance between banks 1 and 2 was ⅝ inch (1.60 cm), the distance between banks 2 and 3, and banks 3 and 4 was ⅜ inch (0.95 cm); the spacing between banks 4 and 5, and banks 5 and 6 was ½ inch (1.27 cm), the spacing between banks 6 and 7 was ⅜ inch (0.95 cm), the distance between banks 7 and 8, banks 8 and 9, banks 9 and 10, and banks 10 and 1 was ½ inch (1.27 cm). The bank 1 had two columns and four rows of rectangular holes 58; the banks 2, 5, 6, 7, and 10 had three columns and four rows of rectangular holes 58; the banks 3, 4, and 9 had four columns and five rows of rectangular holes 58; and column 8 had three columns and five rows of rectangular holes 58. The size of the holes 58 for each column of a bank 56 is listed in Table 1 below.

TABLE 1

| Bank No. | Column | | | |
| --- | --- | --- | --- | --- |
|  | 1 | 2 | 3 | 4 |
| 1 | A* | A |  |  |
| 2 | B** | B | A |  |
| 3 | A | A | A | A |
| 4 | B | A | A | A |
| 5 | A | A | B |  |
| 6 | A | A | A |  |
| 7 | A | B | B |  |
| 8 | A | A | A |  |
| 9 | B | A | A | A |
| 10 | A | A | B |  |

*Holes designated by the letter "A" were 3/16 inch (0.47 cm) wide and 5/16 inch (0.79 cm) high.
**Holes designated by the letter "B" were 2/32 inch (0.16 cm) wide and 5/16 inch (0.79 cm) high.

With reference to FIG. 4 and not limiting to the invention, the base 54 of the flow compensating basket 34 had seven concentric, equally-spaced rings 60 and six equally-spaced linear ribs 62 intersecting the rings 60. Struts 64 are mounted between the rings 60 and the ribs 62 and spaced from one another to provide a plurality of holes between the rings 60 and ribs 62. In a non-limiting example, the base 54 of the basket 34 had seven concentric rings spaced about ⅛ inch (0.32 cm) apart and 28 holes 66 between adjacent ribs 62. As can be appreciated, the number of holes 66 between adjacent rings 60, and between adjacent ribs 62, decreases as the distance to the center of the base 54 decreases. As can be appreciated, the invention is not limited to the number and size of the holes 66 in the base 54 of the flow compensating basket 34 and any of the designs known in the art may be used in the practice of the invention.

The inner surface of the base 54 as shown in FIG. 4 has generally circular recess 68 having a flat inner wall portion 70 (see also FIG. 2) and an upstanding tab 72 (shown only in FIG. 4) spaced from the circular recess 68. The circular recess 68 having the flat inner wall portion 70 and the upstanding tab 72 are part of the orientation arrangement discussed in detail below to position a designated bank at the 6 o'clock position, i.e., facing the inlet end 26 of the meter 20.

The spaced banks 56 of holes 58 of the flow compensating basket 34 act as equal compensating flow dampers effectively evening the flow entering the flow distributing chamber 36 and contacting the vane wheel 38 regardless of the relative radial position of the flow with respect to the inlet flow streamlines flowing around the outer surface of the flow compensating basket 34. A beneficial result of using the flow compensating basket 34 of the invention as part of the flow measuring system 32 is that the flow into the flow distributing chamber body 36 discussed below is dampened to make the flow fairly uniform. For example, the flow of Water entering the opening 29 of the water meter moves against the flow compensating basket in the opening 29 of the water meter. When the flow compensating basket is of the prior art type having uniformly-spaced holes in the walls of the basket, the water moves into the portion of the basket first contacted by the water flowing into the opening 29 with decreasing flow into the basket as the water flows around the outer surface of the basket. As can now be appreciated, the water flowing into the basket has a greater force at the portion of the basket first contacted, e.g., initial position, and a decreasing force as the distance from the initial position increases. The flow compensating basket of the invention provides for reduced flow at the initial position of the basket and provides for a more uniform flow around and into the basket as the distance from the initial position increases.

A uniform water flow rotating the vane wheel 38 provides for a more accurate measurement of flow volume. Additional beneficial results include but are not limited to the resulting loads on the vane wheel 38 and the shaft on which it rotates (discussed below) are balanced radial loads, e.g., (a) relatively even loads on all sides of the flow distributing chamber 36 reducing wear on the vane wheel 38 and shaft, and increasing their useful life; (b) depositing line-borne debris evenly around the bank of holes requiring high debris loads before there are any substantial blockage that can result in substantial effect on the rotation of the vane wheel, which can result in a substantial effect on the accuracy of the flow volume measurements; and (c) less likely forming of localized vortices that can cause an increased pressure drop, e.g., head loss.

Figure 7:
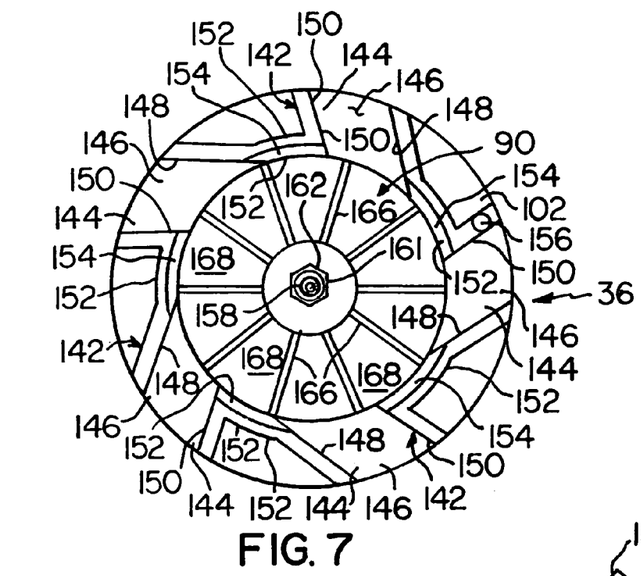
FIG. 7 is an elevated top view of the flow distribution chamber shown in FIG. 5.

With reference to FIGS. 5-7, the discussion will be directed to the flow distributing chamber 36. The flow distributing chamber 36 includes a base 90 having a plurality of spaced flow directional columns 92 having one end 94, e.g., the lower end as viewed in FIG. 5, secured to peripheral surface 96 of the base 90 and opposite other end 100 secured to platform 102 to space the platform 102 from the base 90 and to secure the flow directional columns 92 in a fixed, spaced relationship to one another.

With reference to FIG. 6, the flow directional columns 92 in cross section have a scalene triangular shape (hereinafter also referred to as "triangular") with a portion of triangular base 108, adjacent to triangular short side 110, at the end 94 of the flow directional column 92 secured to the peripheral surface 96 of the base 90. In a non-limiting embodiment of the flow measuring system 32, the base 90 of the flow distributing chamber 36 had a diameter of 2¼ inches (5.715 cm) and the peripheral surface 96 of the base 90 had a height of ½ inch (1.27 cm). Ten flow directional columns 92 were equally spaced around the peripheral surface 96 of the base 90. Each of the flow directional columns 92 in cross section had a triangular base 108 having a length of ⅝ inch (1.59 cm), the triangular short side 110 had a length of ¼ inch (0.64 cm), and triangular long side 112 had a length of ⁷⁄₁₆ inch (1.11 cm) (see FIG. 6). About ¼ inch (0.64 cm) of the triangular base 108 was secured to the peripheral surface 96 of the base 90 and the remaining portion of the triangular base 108 and a tangent line to the peripheral surface 96 of the base 90 subtended an angle of 40°. With the above arrangement, passageway spacing 114 between adjacent flow directional columns 92 had a width of ⅜ inch (0.95 cm). With reference to FIG. 6, the triangular long side 112 and the triangular base 108 of the flow directional columns 92 form an edge that points in a clockwise direction when the flow distributing chamber 36 is mounted in the flow compensating basket 34 as shown in FIG. 2 (the flow distributing chamber 36 in FIG. 6 is viewed from the bottom and, from this view, the edge formed by the triangular base 108 and the triangular long side 112 is shown in a counterclockwise direction). In this manner, water moving through the holes 58 of the banks 56 of the sidewall 50 of the flow compensating basket 34 (see FIG. 3) flows into the passageways 114 between the flow directional columns 92 into the interior of the flow distributing chamber 36, without changing flow direction.

Lower surface 120 of the platform 102 has an outer groove 124 (see FIG. 6) for receiving the upper ledge 52 of the flow compensating basket 34 (see FIG. 4), and a collar 126 (see FIG. 5). The upper end 100 of the flow directional columns 92 is secured to the collar 126. A plurality of spaced spacers 128 (see FIG. 5) are provided on the outer surface of the collar 126 to properly align the flow distributing chamber 36 when the upper ledge 52 of the flow compensating basket 34 is inserted in the collar 126. With reference to FIG. 6, lower surface 130 of the base 90 of the flow distributing chamber 36 has a circular rise 134 (see also FIG. 5) having an outer circular surface portion 136 and a flat portion 138 and a cut out 140 spaced from the circular rise 134. With the flow distributing chamber 36 positioned in the flow compensating basket 34, the circular rise 134 of the flow distributing chamber 36 is inserted into the center recess 68 of the flow compensating basket 34, and the tab 72 of the flow compensating basket 34 is inserted into the cut out 140 in the base 90 of the flow distributing chamber 36 to align the basket 34 and the chamber 36, more particularly but not limiting to the invention, position the triangular long side 112 of one of the flow directional columns 92 at the 6 o'clock position.

With reference to FIG. 7, flow directional members 142 are mounted on upper surface 144 of the platform 102 to form a plurality of flow directional exit passageways 146 for directing the water out of the flow distributing chamber 36 into the outlet chamber 28 of the water meter 20 (see FIG. 1) in a predetermined direction. In a non-limiting embodiment of the invention, the exit passageways 146 direct the water out of the chamber 36 in a counterclockwise direction. In this manner, the flow of water as it enters the chamber 36 through the passageways 114 between the flow directional columns 92 is in a counterclockwise direction, and the flow of water as it exits the flow distributing chamber 36 through the flow directional exit passageways 146 is in a counterclockwise direction.

The invention is not limited to the construction of the flow directional passageways 146. In the non-limiting embodiment of the invention, the passageways 146 having a width of ⅝ inch (1.58 cm) and a height of ¾ inch (1.90 cm) were constructed by spacing five generally "U"-shaped flow directional members 142 on upper surface 144 of the platform 102. The U-shaped members each include a first outer leg 148 and a second outer leg 150 connected by a middle leg 152. The first outer leg 148 of the U-shaped directional members 142 is spaced from the second outer leg 150 of adjacent one of the flow directional members 142 as shown in FIG. 7.

With continued reference to FIG. 7, a groove 154 is provided in upper surface of the middle leg 152 of the U-shaped members 142, and a tab 156 is provided on upper surface of one of the legs of the U-shaped members 142, e.g. and not limiting to the invention, the leg 150 of one of the members, to receive and align the meter register assembly 43 in a manner discussed below.

Figure 7A:
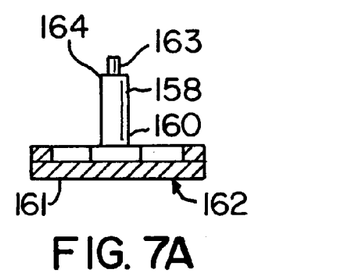
FIG. 7A is an elevated side view, partly in cross section, of an insert having a shaft, the insert shown in FIG. 7 mounted in the flow distribution chamber.

With reference to FIGS. 7 and 7A, a shaft 158 has one end 160 mounted to a base 161 of insert 162. The insert 162 is securely mounted in a center recess (not shown) in the upper surface of the base 90 of the flow distributing chamber 36 (see FIG. 7) in any convenient manner such that the shaft 158 extends upward from the center of the upper surface of the base 90 of the flow distributing chamber 36. Opposite end 163 of the shaft 158 has a step 164 formed by a reduction in the diameter of the shaft 158 to receive the vane wheel 38 discussed below. The shaft 158 can be made of any rigid material. In a non-limiting embodiment of the invention, the shaft 158 was made of stainless steel to provide a shaft that is rigid and has minimal, if any, rust. Although not limiting to the invention, the inner surface of the base 90 of the flow distributing chamber 36 is provided with ribs 166 extending from the center of the base 90 to a flow directional column 92 to form a plurality of recesses 168 to facilitate water moving between the bottom of the vane water wheel 38 and the base 90 of the flow distributing chamber 36.

Figure 8:
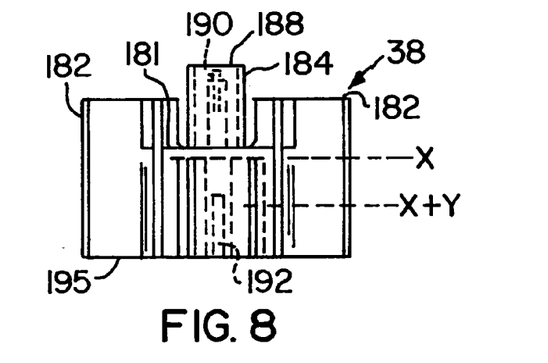
FIG. 8 is a side elevated view of a non-limiting embodiment of a vane wheel incorporating features of the invention.
Figure 9:
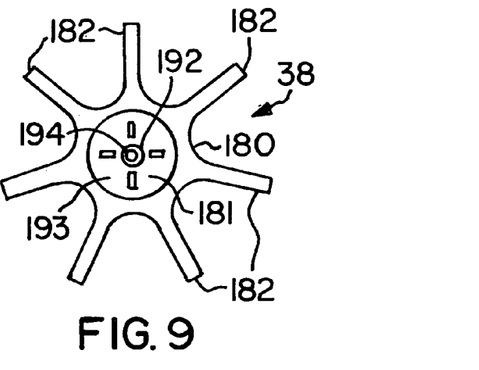
FIG. 9 is a bottom elevated view of the vane wheel shown in FIG. 8.
Figure 10:
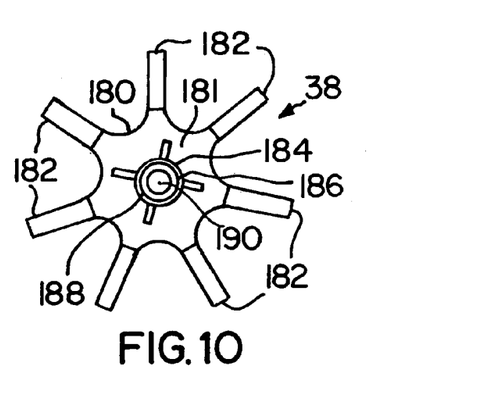
FIG. 10 is a top elevated view of the vane wheel shown in FIG. 8.

With reference to FIGS. 8-10, the discussion is directed to the vane water wheel 38 incorporating features of the invention. The vane wheel 38 has a hollow cylindrical body 180 having a closed end 181 and a plurality of equally spaced vanes 182 extending therefrom. In the non-limiting embodiment under discussion, there were seven vanes 182 having a height of 1¼ inches (3.18 cm), a width of ½ inch (1.27 cm), and a thickness of ³⁄₃₂ inch (0.24 cm). The cylindrical body 180 had an outside diameter of 1 inch (2.54 cm) and a height of 1 inch (2.54 cm). With reference to FIG. 10, an outer center shaft 184 had a diameter of ⅜ inch (0.95 cm) extended ⅝ inch (1.59 cm) above the closed end 181 of the cylindrical body 180 and ¼ inch (0.64 cm) above the vanes 182 (see also FIG. 8). A ring magnet 186 is mounted in upper end 188 of the outer center shaft 184 for rotating the magnetic drive arrangement 40 of the meter register 42 shown in FIG. 18 and discussed below. A pin shaft 190 is centrally mounted in the outer center shaft 184 and received by the meter register assembly 43.

A lower hollow shaft 192 is mounted to inner surface 193 of the closed end 181 and extends through the center of the cylindrical body 180. The shaft 192 has a sleeve 194 having a jeweled bearing (not shown) for mounting the vane wheel 38 on step 164 of the shaft 158 of the flow distributing chamber 36 (see FIGS. 7 and 7A). Mounting the shaft 190 in the meter register assembly 43 and the jeweled bearing of the sleeve 194 on the shaft 158 of the flow distributing chamber 36 rotates the vane wheel 38 about a centrally disposed axis with minimal, if any, wobble. As can be appreciated, the distance of bottom 195 of the vane wheel 38 from the base 90 of the flow distributing chamber 36 (see FIGS. 2 and 5) is not limited to the invention; however, the distance should be sufficient to allow for movement of water therebetween and free rotation of the vane wheel. A distance of ⅛ inch (0.32 cm) was used and is not limiting to the invention.

The vane wheel 38 can be made of any material, in the non-limiting embodiment of the vane wheel, the vane wheel 38 was a one-piece molded plastic. Preferably, the plastic material used for the vane wheel has a density less than the liquid it is to measure, i.e., less than water for a water meter application. With reference to FIG. 8, the vane wheel 38 having the sleeve 194, the ring magnet 186, and shaft 190 has a center of buoyancy (for water) as measured from the end 188 of the upper outer shaft 184 designated as "X", and the vane wheel 38 having the sleeve 194, ring magnet 186, and shaft 184 has a center of gravity as measured from the end 188 of the upper outer shaft 184 designated as "X+Y". Any addition or reduction in the weights or the selection of materials to obtain this relationship can be determined by one skilled in the art.

Vane wheels having the center of buoyancy above the center of gravity prevents angular displacement of the vane wheel 38 relative to the shaft 158 of the flow distributing chamber 36 (see FIG. 7A) and angular displacement of the shaft 190 of the vane wheel 38 (see FIG. 10), thereby reducing wear on the wheel bearing provided by the sleeve 194 (see FIG. 9). The difference in the distance between the center of gravity and the center of buoyancy, and between the center of buoyancy and the end 188 of the vane wheel 38 (see FIG. 8) is not limiting to the invention. In a non-limiting example, the distance from the end 188 to the center of buoyancy of the vane wheel 38 is in the range of ½ to 1 inch (1.27 to 2.54 cm) and the distance between the center of buoyancy and the center of gravity of the vane wheel 38 is preferably in the range of ⅛ to ¾ inch (0.32 to 1.90 cm).

The discussion is now directed to the meter register assembly 43. As discussed above, the flow compensating basket 34 has a preferred orientation relative to the inlet end 26 of the water meter 20, e.g., to the 6 o'clock position. As can be appreciated, the meter register 42 has a preferred orientation for manual reading, e.g., facing the reader. As can further be appreciated by those skilled in the art, the placement of the water meter 20 between water inlet and water outlet pipes (not shown) varies from location to location. To accommodate this situation, and not limiting to the invention, a shroud 200 (see FIGS. 2 and 11-13) is mounted in the groove 154 in the flow directional members 142 of the flow distributing chamber 36 (see FIG. 7) to orient the flow compensating basket 34 relative to the inlet end 26 of the water meter 20 (see FIG. 1) and to orient the meter register 42 relative to the manual reader.

Figure 11:
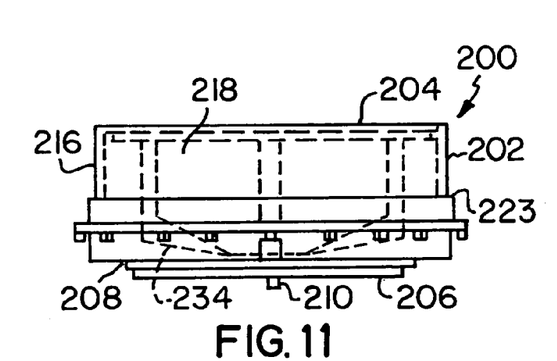
FIG. 11 is a side elevated view of a non-limiting embodiment of a shroud for containing a water meter, the shroud incorporating features of the invention.
Figure 12:
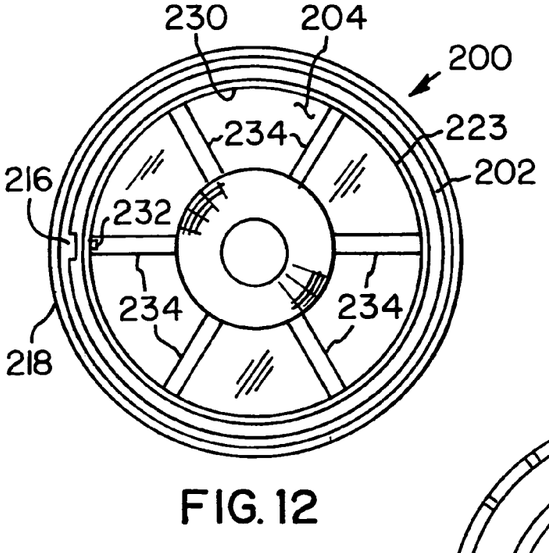
FIG. 12 is a bottom elevated view of the shroud shown in FIG. 11.
Figure 13:
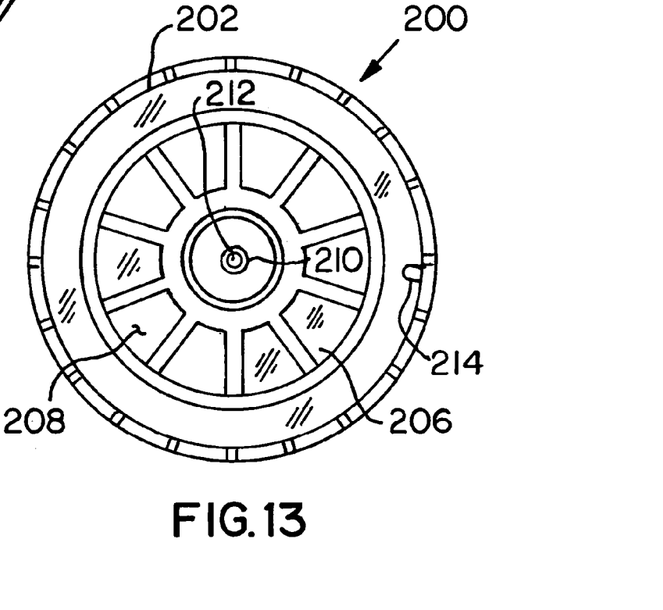
FIG. 13 is a top elevated view of the shroud shown in FIG. 11.

With reference to FIGS. 11-13 there is shown a non-limiting embodiment of a meter register shroud 200. The shroud 200 has a cylindrical sidewall 202, an open end 204 shown in FIG. 12, and a closed end or base 206 shown in FIG. 13. Outer surface 208 of the closed end 206 is shaped for mounting the base 206 of the shroud 200 on the U-shaped flow directional members 142 and detachably secure portions of the base 206 of the shroud 200 in the grooves 154 in the flow directional members 142 by a pressure fit. The outer surface 208 of the shroud 200 has an extension 210 having an elongated passageway 212 therein (see FIG. 13). A jeweled bearing (not shown) is mounted in the elongated passageway 212 to receive the shaft 190 of the vane wheel 38 (see FIG. 10). The outer surface 208 of the base 206 is provided with a recess 214 to receive the tab 156 of the flow distributing chamber 36 (see FIG. 7) to align the flow compensating basket 34 to the inlet end 26 of the water meter 20.

Figure 14:
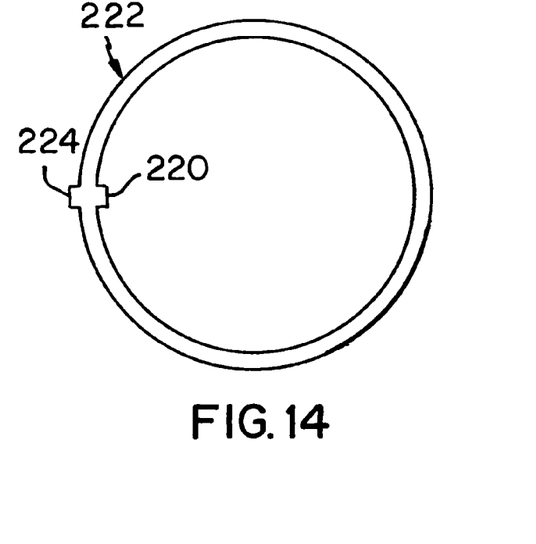
FIG. 14 is a top elevated view of an orientation ring for orienting the flow measuring system in a water meter in accordance with the invention.

With reference to FIG. 12, a registration groove 216 is provided on outer surface 218 of the sidewall 202 to receive inner tab 220 of orientation ring 222, shown in FIG. 14, when the orientation ring 222 is placed over the outer surface 218 of the sidewall 202 of the shroud 200 and rests on ledge 223 (see also FIG. 11). Outer tab 224 of the orientation ring 222 is received in groove 226 on inner surface of the water meter 20 shown in FIG. 1. With this orientation arrangement, the flow compensating basket 34 incorporating features of the invention can be properly aligned with the inlet end 26 of the water meter 20. Referring now to FIG. 12, inner surface 230 of the sidewall 202 of the shroud 200 is provided with a tab 232 to orient the meter register 42 in a manner discussed below for ease of obtaining visual information from the meter register by a manual reader.

With reference to FIGS. 11 and 12, the inner surface of the shroud 200 has ribs 234, which are shaped to seat the lower portion of the meter register 42 in the shroud 200. As can be appreciated, shrouds are well known in the art and no further discussion is deemed necessary.

With reference to FIGS. 15-18, the discussion will now be directed to the meter register 42. The meter register 42 is not limiting to the invention and can be any of the types used and/or disclosed in the art. Although not limiting to the invention, the meter register 42 can be of the type disclosed in U.S. patent application Ser. No. 10/864,312, filed Jun. 9, 2004, in the name of Dan Winter for "Meter Register Having An Encoder For Measuring Material Flow And An Algorithm To Selectively Block Signal Transmission" (hereinafter also referred to as "application Ser. No. 10/864,312"); U.S. patent application Ser. No. 10/864,308, filed Jun. 9, 2004, in the names of Ronald Koch and Dan Winter for "Meter Register and Remote. Meter Reader Utilizing A Stepper Motor" (hereinafter also referred to as "application Ser. No. 10/864,312"); U.S. Provisional Patent Application Ser. No. 60/578,602, filed on Jun. 10, 2004, in the name of Eli Berkovitch for "Multi-Jet Meter with Flow Compensating Basket"; and PCT Publication No. WO 02/073735 (hereinafter also referred to as "WO 02/073735") to Winter and titled "Meter Register." The aforementioned documents are hereby incorporated by reference in their entirety.

Figure 15:
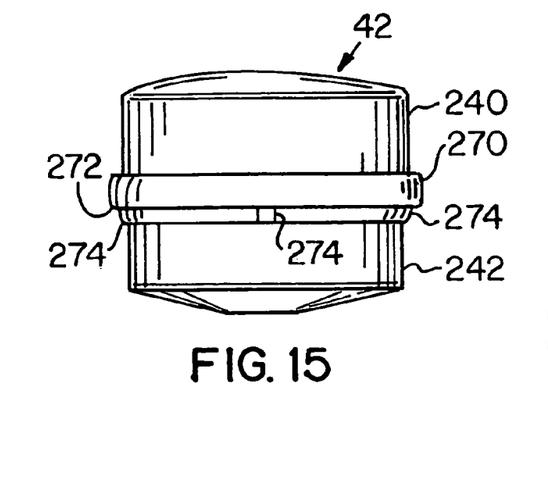
FIG. 15 is an elevated view of a non-limiting embodiment of a meter register.
Figure 16:
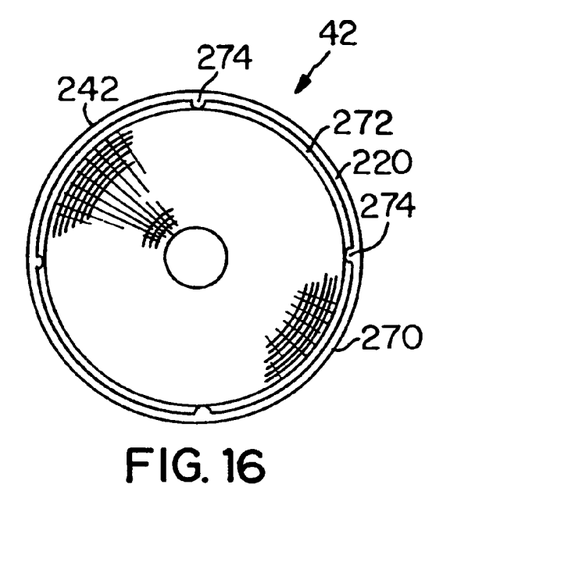
FIG. 16 is an elevated bottom view of the meter register shown in FIG. 15.
Figure 17:
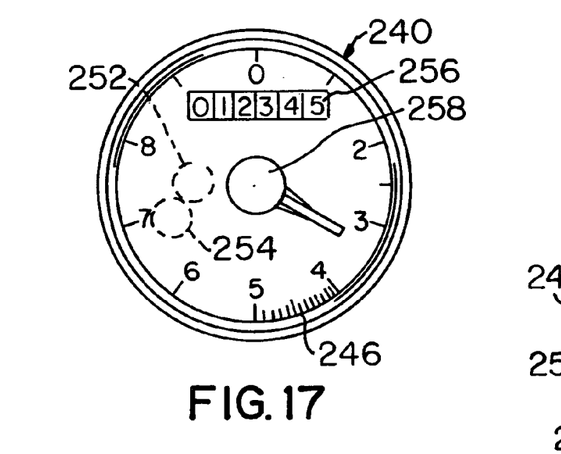
FIG. 17 is an elevated top view of the meter register shown in FIG. 15.
Figure 18:
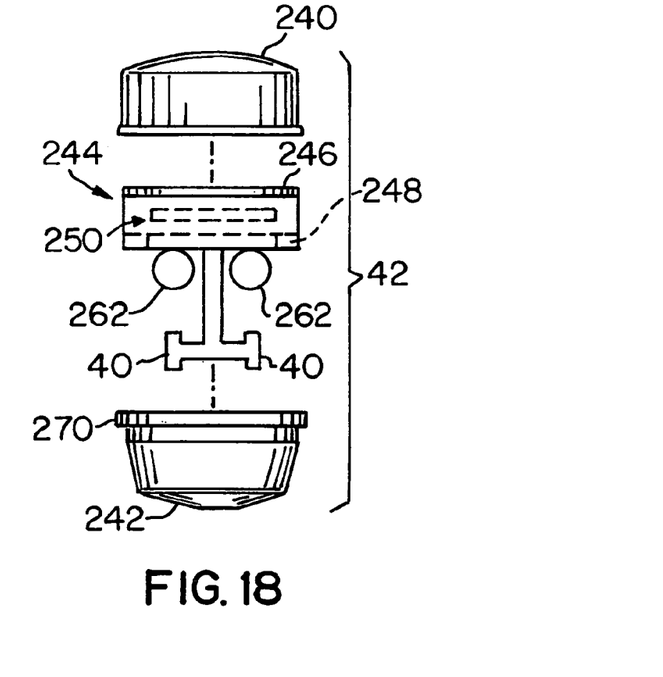
FIG. 18 is an exploded segmented view of the meter register shown in FIG. 15.

With continued reference to FIGS. 15-18, the meter register 42 includes a face cap 240 mechanically sealed to a cup 242 in any convenient manner. Preferably, the face cap 240 is made of glass or a clear polymeric material, and the cup 242 is made of metal, e.g. but not limiting the invention thereto, copper or stainless steel. The metal cup 242 is received in the polymeric shroud 200. Referring to FIGS. 17 and 18, within the face cap 240 and the cup 242, the meter register 42 includes a register subassembly 244. The register subassembly 244 includes a faceplate 246, a gear train drive 248, and a direction detection arrangement 250. The gear train drive 248 is coupled to a gear drive 252 (shown in FIG. 17) positioned on the back of the faceplate 246. The gear drive 252 includes meshed gears 254 which drive both an odometer 256 and rotate a sweep hand 258. The gear train drive 248 is powered by the magnetic drive arrangement 40, which is driven by the ring magnet 186 mounted on the vane water wheel 38 as discussed above. Batteries 262 power the electronics of the direction detection arrangement 250.

For a more detailed discussion of the internal components of the meter register, reference can be had to the above-mentioned documents.

With reference to FIGS. 12, 15, and 16, the cup 242 has a rimed portion 270 to secure the face cap 240 to the cup 242 to seal the meter register 42. A lower surface 272 of the rimed portion 270 has four equally spaced depressions 274. Each of the depressions 274 is sized to receive the tab 232 on the inner surface 230 of the shroud 200 (see FIG. 12). In practice, the cup 242 of the meter register 42 is placed in the shroud 200 and the meter register 42 rotated to a position where the faceplate 246 of the meter register 42 is readable, and the depression 274 of the meter register 42 is aligned with the tab 232 of the shroud 200. The meter register 42 is placed in the shroud 200 with the rimed portion 270 supported by the ledge 223 of the sidewall 202 of the shroud 200 (see FIGS. 11 and 12).

As can be appreciated by those skilled in the art, the invention is not limited to the material of the flow compensating basket 34, the flow distributing chamber 36, the vane water wheel 38, the shroud 200, or the meter register 42 of the flow measuring system 32. Although not limiting to the invention, the parts of the flow compensating basket 34, the flow distributing chamber 36, the vane water wheel 38, and the shroud 200, which are exposed to flowing water, are preferably made of a non-rust material, e.g., plastic or stainless steel. The materials used to make the components of meter register 42 are well known in the art and no discussion regarding the material for making the components is deemed necessary.

With reference to the FIG. 2 and FIGS. 1 and 3-18 as needed, in a non-limiting embodiment of the invention, the flow distributing chamber 36 is secured in the flow-compensating basket 34, and the vane wheel 38 mounted on the shaft 158 of the flow distributing chamber 36. The shroud 200 is mounted in the grooves 154 of the U-shaped directional members 142 of the flow distributing chamber 36 with the shaft 190 of the vane wheel 38 mounted in the extension 210 of the shroud 200. The orientation ring 222 is mounted over the sidewall 202 of the shroud 200. The assembled basket 34, chamber 36, and shroud 200 are placed in the opening 29 connecting the inlet chamber 24 and outlet chamber 30 of the water meter 20. The flow compensating basket 34 is in the inlet chamber 24 and the upper portion of the flow distributing chamber 36, i.e., the flow directional members 142 in the outlet chamber 28. The cup 242 of the meter register 42 is placed in the shroud 200, and rimed portion 280 (see FIG. 1) screwed onto threads 282 on the body 22 of the water meter 20 to secure the flow measuring system 32 in the water meter 20. Although not discussed and appreciated by those skilled in the art, washers and gaskets are positioned between the water meter 20 and the flow measuring system 32 as needed to move water from the inlet chamber 24 to the outlet chamber 28 only through the flow measuring system 32, and to prevent water from leaking out of the water meter 20, e.g., through the rimed portion 270.

With the flow measuring system 32 in the water meter 20, water moves into the inlet end 26 of the meter 20 moving against the outer surface of the flow compensating basket 34 and around the sidewall of the basket 34 in a counterclockwise direction, with portions of the water moving through the openings 58 into the basket 34, around the flow distributing chamber 36 in a counterclockwise direction, with portions of the water moving through the passageways 114 between the columns 92 against the vanes 182 of the vane water wheel 38 to rotate the vane wheel 38. The water moves upward through the flow distributing chamber 36 and out of the passageways 146 between the flow directional members 142 into the outlet chamber 28. The water moves through the outlet chamber 28 and out of the outlet end 30 of the water meter 20. As the vane wheel 38 rotates, the ring magnet of the vane water wheel 38 rotates the magnetic drive arrangement 40 of the meter register 42 to measure the water flow volume moving through the meter 20.

The form of the invention shown and described above represents illustrative non-limiting embodiments of the invention. It is understood that various changes may be made without departing from the teachings of the invention defined by the claimed subject matter that follows.

What is claimed is:

1. A flow compensating basket for a fluid measuring system of the type having a meter register mounted on a flow distributing chamber, a portion of the flow distributing chamber mounted in the flow compensating basket and a vane wheel rotatably mounted in the flow distributing chamber, the flow compensating basket comprising:

a hollow cylindrical member having an open end and an opposite closed end, sidewall of the cylindrical member having a plurality of spaced banks with solid sidewall portions between adjacent banks, each of the banks having a plurality of holes extending through the sidewall, with the holes of each bank arranged in rows and columns, wherein at least one of the following of (1) distance between the banks, (2) the number of rows in the banks, (3) the number of columns in the banks, and (4) the size of the holes in the banks is varied around the sidewall to control the fluid flow through the holes of the banks.

2. The flow compensating basket according to claim 1, wherein the opposite closed end has a plurality of spaced holes therethrough.

3. The flow compensating basket according to claim 1, wherein the basket has an outside diameter of about 2 inches (5.08 cm) and the sidewall height of about 1½ inches (3.81 cm), ten banks of spaced rectangular holes, the distance between bank 1 and bank 2 is ⅝ inch (1.59 cm), the distance between bank 2 and bank 3, and bank 3 and bank 4 is ⅜ inch (0.95 cm), the spacing between bank 4 and bank 5, and bank 5 and bank 6 is ½ inch (1.27 cm), the spacing between bank 6 and bank 7 is ⅜ inch (0.95 cm), and the distance between bank 7 and bank 8, bank 8 and bank 9, bank 9 and bank 10, and bank 10 and bank 1 is ½ inch (1.27 cm).

4. The flow compensating basket according to claim 3, wherein bank 1 has two columns and four rows of rectangular holes, banks 2, 5, 6, 7, and 10 have three columns and four rows of rectangular holes, banks 3, 4, and 9 have four columns and five rows of rectangular holes, and bank 8 has three columns and five rows of rectangular holes.

5. The flow compensating basket according to claim 4, wherein the size of the holes for each column of a bank is as follows:

|          | Column |   |   |   |
| -------- | ------ | - | - | - |
| Bank No. | 1      | 2 | 3 | 4 |
| 1 | A* | A | | |
| 2 | B** | B | A | |
| 3 | A | A | A | A |
| 4 | B | A | A | A |
| 5 | A | A | B | |
| 6 | A | A | A | |
| 7 | A | B | B | |

-continued

| Bank No. | Column | | | |
|---|---|---|---|---|
| | 1 | 2 | 3 | 4 |
| 8 | A | A | A | |
| 9 | B | A | A | A |
| 10 | A | A | B | |

*holes designated by the letter "A" are 3/16 inch (0.48 cm) wide and 5/16 inch (0.79 cm) high; and
**holes designated by the letter "B" are 2/32 inch (0.16 cm) wide and 5/16 inch (0.79 cm) high.

6. The flow compensating basket according to claim 1, wherein the fluid measuring system is a system to measure the flow volume of water through a water meter.

7. The flow compensating basket according to claim 1, wherein the holes extending through the sidewall of the member provides a uniform fluid flow against the sidewall of and into the member from initial point of contact of fluid with the sidewalls of the member and along the sidewalls of the member as the distance from the initial point of contact increases.

8. A vane wheel for a fluid measuring system of the type having a meter register mounted on a flow distributing chamber, a portion of the flow distributing chamber mounted in a flow compensating basket, and the vane wheel rotatably mounted in the flow distributing chamber, the vane wheel comprising:
a cylindrical body having a first end and an opposite second end, a first elongated passageway accessible from the first end of the body and terminating short of the second end of the body, a second elongated member having one end mounted to and extending away from the second end of the body, and a plurality of spaced vanes extending from the body, wherein distance between the center of buoyancy of the vane wheel and the second end of the body is a first predetermined distance, and distance between the center of gravity of the vane wheel and the second end of the body is defined as a second predetermined distance, and the first predetermined distance is less than the second predetermined distance.

9. The vane water wheel according to claim 8, wherein the fluid measuring system is a system to measure the flow volume of water through a water meter.

10. A meter for measuring fluid flow comprising:
a meter body having an inlet end, an outlet end, and a chamber interconnecting the inlet end and outlet end;
a flow compensating basket received within said chamber of said meter body, said compensating basket includes a hollow cylindrical member having an open end and an opposite closed end, sidewall of the cylindrical member having a plurality of spaced banks with solid sidewall portions between adjacent banks, each of the banks having a plurality of holes extending through the sidewall, with the holes of each bank arranged in rows and columns, wherein at least one of the following of (1) distance between the banks, (2) the number of rows in the banks, (3) the number of columns in the banks, and (4) the size of the holes in the banks is varied around the sidewall to control the fluid flow through the banks;
a flow distributing chamber mounted in said flow compensating basket;
a vane wheel rotatably mounted in said flow distributing chamber, said vane wheel includes a cylindrical body having a first end and an opposite second end, a first elongated passageway accessible from the first end of the body and terminating short of the second end of the body, a second elongated member having one end mounted to and extending away from the second end of the body, and a plurality of spaced vanes extending from the body, wherein distance between the center of buoyancy of the vane wheel and the second end of the body is a first predetermined distance, and distance between the center of gravity of the vane wheel and the second end of the body is defined as a second predetermined distance, and the first predetermined distance is less than the second predetermined distance; and
a meter register assembly operationally connected to and acted on by said vane wheel.

11. The meter according to claim 10, further including an orientation system to position said basket, said chamber, and said wheel in the measuring chamber in a predetermined relationship to the inlet end of the meter.

12. The meter according to claim 10, wherein the closed end of said flow compensating basket has a plurality of spaced holes therethrough.

13. The meter according to claim 10, wherein said flow compensating basket has an outside diameter of about 2 inches (5.08 cm) and the sidewall has a height of about 1½ inches (3.81 cm), ten banks of spaced rectangular holes, the distance between bank 1 and bank 2 is 5/8 inch (1.59 cm), the distance between bank 2 and bank 3, and bank 3 and bank 4 is 3/8 inch (0.95 cm), the spacing between bank 4 and bank 5, and bank 5 and bank 6 is ½ inch (1.27 cm), the spacing between bank 6 and bank 7 is 3/8 inch (0.95 cm), and the distance between bank 7 and bank 8, bank 8 and bank 9, bank 9 and bank 10, and bank 10 and bank 1 is ½ inch (1.27 cm).

14. The meter according to claim 13, wherein the bank 1 has two columns and four rows of rectangular holes, the banks 2, 5, 6, 7, and 10 have three columns and four rows of rectangular holes, the banks 3, 4, and 9 have four columns and five rows of rectangular holes, and the bank 8 has three columns and five rows of rectangular holes.

15. The meter according to claim 14, wherein the size of the holes for each column of the bank of said flow compensating basket is as follows:

| Bank No. | Column | | | |
|---|---|---|---|---|
| | 1 | 2 | 3 | 4 |
| 1 | A* | A | | |
| 2 | B** | B | A | |
| 3 | A | A | A | A |
| 4 | B | A | A | A |
| 5 | A | A | B | |
| 6 | A | A | A | |
| 7 | A | B | B | |
| 8 | A | A | A | |
| 9 | B | A | A | A |
| 10 | A | A | B | |

*holes designated by the letter "A" are 3/16 inch (0.48 cm) wide and 5/16 inch (0.79 cm) high; and
**holes designated by the letter "B" are 2/32 inch (0.16 cm) wide and 5/16 inch (0.79 cm) high.

16. The flow compensating basket according to claim 10, wherein the holes extending through the sidewall of the member provides a uniform fluid flow against the sidewall of and into the member from initial point of contact of fluid with the sidewalls of the member and along the sidewalls of the member as the distance from the initial point of contact increases.

17. A flow compensating basket for a fluid measuring system of the type having a meter register mounted on a flow distributing chamber, a portion of the flow distributing chamber mounted in the flow compensating basket and a vane wheel rotatably mounted in the flow distributing chamber, the flow compensating basket comprising:
 a hollow cylindrical member having an open end and an opposite closed end, sidewall of the cylindrical member having a plurality of spaced banks with solid sidewall portions between adjacent banks, each of the banks having a plurality of holes extending through the sidewall.

18. The flow compensating basket according to claim 17, wherein each of said holes defines a flow area and the sum of the flow areas for each bank defines a bank flow area, wherein at least one bank flow area is different than the other bank flow areas.

\* \* \* \* \*